US009165606B2

(12) United States Patent
Chen et al.

(10) Patent No.: US 9,165,606 B2
(45) Date of Patent: Oct. 20, 2015

(54) ELECTRONIC DEVICE

(71) Applicant: Wistron Corp., New Taipei (TW)

(72) Inventors: Kuang Wen Chen, New Taipei (TW);
Rong-Fan Tan, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days.

(21) Appl. No.: 14/321,728

(22) Filed: Jul. 1, 2014

(65) Prior Publication Data

US 2015/0243330 A1  Aug. 27, 2015

(30) Foreign Application Priority Data

Feb. 24, 2014  (CN) .......................... 2014 1 0061963

(51) Int. Cl.
*H01R 13/62* (2006.01)
*G11B 33/02* (2006.01)

(52) U.S. Cl.
CPC ............ *G11B 33/027* (2013.01); *G11B 33/022* (2013.01); *H01R 13/62* (2013.01)

(58) Field of Classification Search
USPC ................................................ 720/636–637
See application file for complete search history.

(56) References Cited

U.S. PATENT DOCUMENTS

| 6,315,583 | B1 * | 11/2001 | Nishioka | ....................... 439/131 |
| 7,522,409 | B2 * | 4/2009 | Lin et al. | .................. 361/679.01 |
| 2009/0316342 | A1 * | 12/2009 | Li et al. | .................... 361/679.01 |
| 2013/0215568 | A1 * | 8/2013 | Kumachi | ................. 361/679.33 |

\* cited by examiner

*Primary Examiner* — Wayne Young
*Assistant Examiner* — Carlos E Garcia

(57) ABSTRACT

An electronic device includes a housing with a carrier therein. The carrier includes a recess with a restricting portion therein. An access unit is disposed in the recess. An elastic member is connected to the access unit and engaged with the restricting portion to restrict the access unit in the recess. A fixed member is connected to the access unit. A movable member is movably disposed on the carrier, including a first contact portion and a second contact portion. When an external force is exerted on the movable member along a first direction, the first contact portion pushes the elastic member along the first direction to deform and separate from the restricting portion, and the second contact portion pushes the fixed member to move along a second direction perpendicular to the first direction, such that the access unit can be removed from the housing.

10 Claims, 11 Drawing Sheets

ELECTRONIC DEVICE

CROSS REFERENCE TO RELATED APPLICATIONS

The present application claims priority of China Patent Application No. 201410061963.2, filed on Feb. 24, 2014, the entirety of which is incorporated by reference herein.

BACKGROUND OF THE INVENTION

1. Field of the Invention

The present application relates to an electronic device, and in particular to a personal computer (PC) with an access unit capable of quick installation and uninstallation.

2. Description of the Related Art

Presently, the installation and uninstallation of an access unit, such as an optical disk drive (ODD) module or a hard disk drive (HDD) module to/from a personal computer (PC) are usually complicated. For example, to take apart an ODD module from a PC, the housing of the PC is first removed, and the connector jointed with the ODD module is removed. Consequently, the screws used for mounting the ODD module on a bracket in the PC are loosened, such that the ODD module can be drawn out of the PC. Conversely, to install the ODD module in the PC, the aforementioned procedures should be taken in reverse order.

It should be noted that the conventional installation and uninstallation procedures of the access unit have some disadvantages, such as being complicated, inflexible, and time consuming. Therefore, it may easily cause inconvenient operation for users and adversely affect the production efficiency and the manufacturing overhead (MOH) for the production lines.

BRIEF SUMMARY OF THE INVENTION

In view of the aforementioned known problems, an embodiment of the invention provides an electronic device. The electronic device includes a housing and a carrier disposed in the housing. The carrier includes a recess with a first restricting portion therein. An access unit is disposed in the recess. An elastic member is connected to the access unit and engaged with the first restricting portion to restrict the access unit in the recess. A fixed member is connected to the access unit. A movable member is movably disposed on the carrier, including a first contact portion and a second contact portion. When an external force is exerted on the movable member along a first direction, the first contact portion pushes the elastic member along the first direction to deform and separate from the restricting portion, and the second contact portion pushes the fixed member to move along a second direction perpendicular to the first direction, such that the access unit can be removed from the housing.

In another embodiment, the fixed member includes an inclined surface, and when the fixed member is pushed by the second contact portion, the second contact portion forces the inclined surface to move the fixed member and the access unit along the second direction.

In another embodiment, the elastic member comprises a longitudinal hollow structure substantially extended along the second direction.

In another embodiment, the elastic member includes a first hook, and the access unit is restricted in the recess when the first hook is engaged with the first restricting portion.

In another embodiment, when the elastic member is pushed by the first contact portion, the first contact portion pushes the first hook to deform along the first direction and separate from the first restricting portion.

In another embodiment, the elastic member further includes a second hook, and the first and second hooks are respectively formed on opposite ends of the longitudinal hollow structure, and the carrier further includes a second restricting portion in the recess, wherein when the first restricting portion is engaged with the first hook, and the second restricting portion is engaged with the second hook, the access unit is restricted in the recess.

In another embodiment, the elastic member further includes a bent portion formed between the first hook and the second hook, and the bent portion is depressed toward the interior of the longitudinal hollow structure.

In another embodiment, the movable member comprises a y-shaped structure.

In another embodiment, the electronic device further comprises a button disposed on the housing, wherein when the external force is exerted on the button along the first direction, the button pushes the movable member to move along the first direction.

In another embodiment, the electronic device further comprises a connector disposed on the carrier, wherein when the first restricting portion is engaged with the elastic member to restrict the access unit in the recess, the access unit is connected to the connector.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1A:
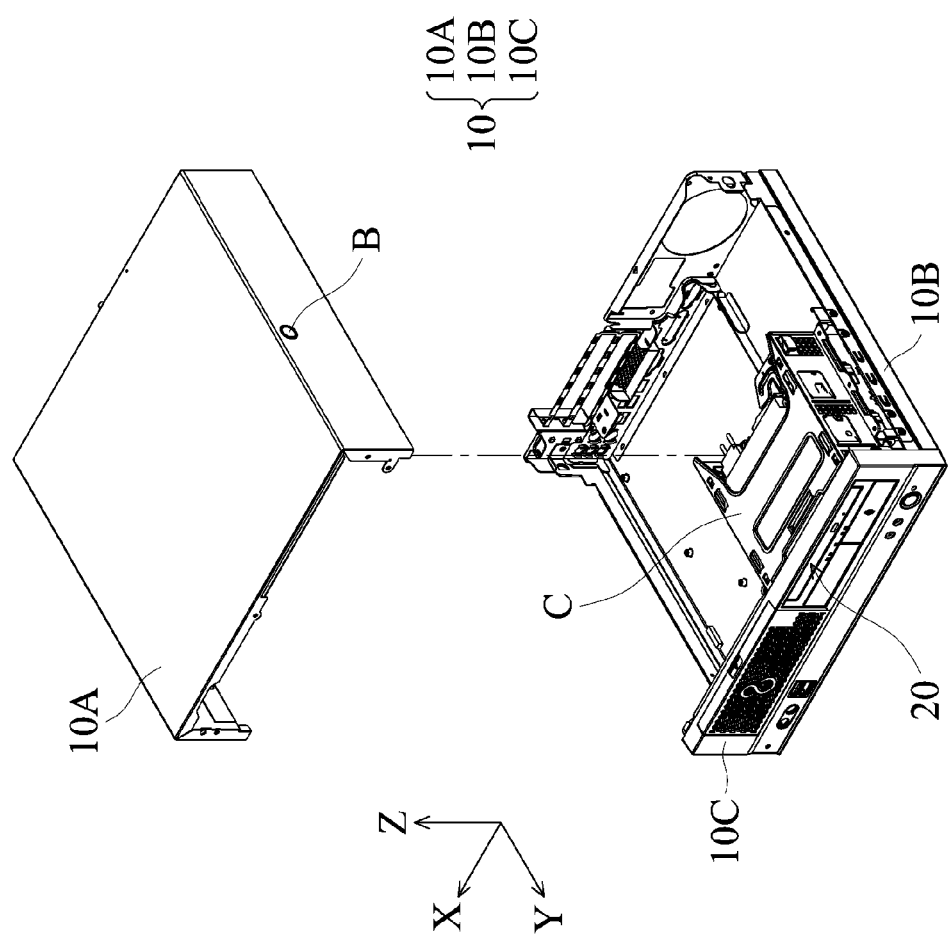
FIG. 1A is a schematic view showing the top cover and the bottom cover of an electronic device separated from each other according to an embodiment of the invention.
Figure 1B:
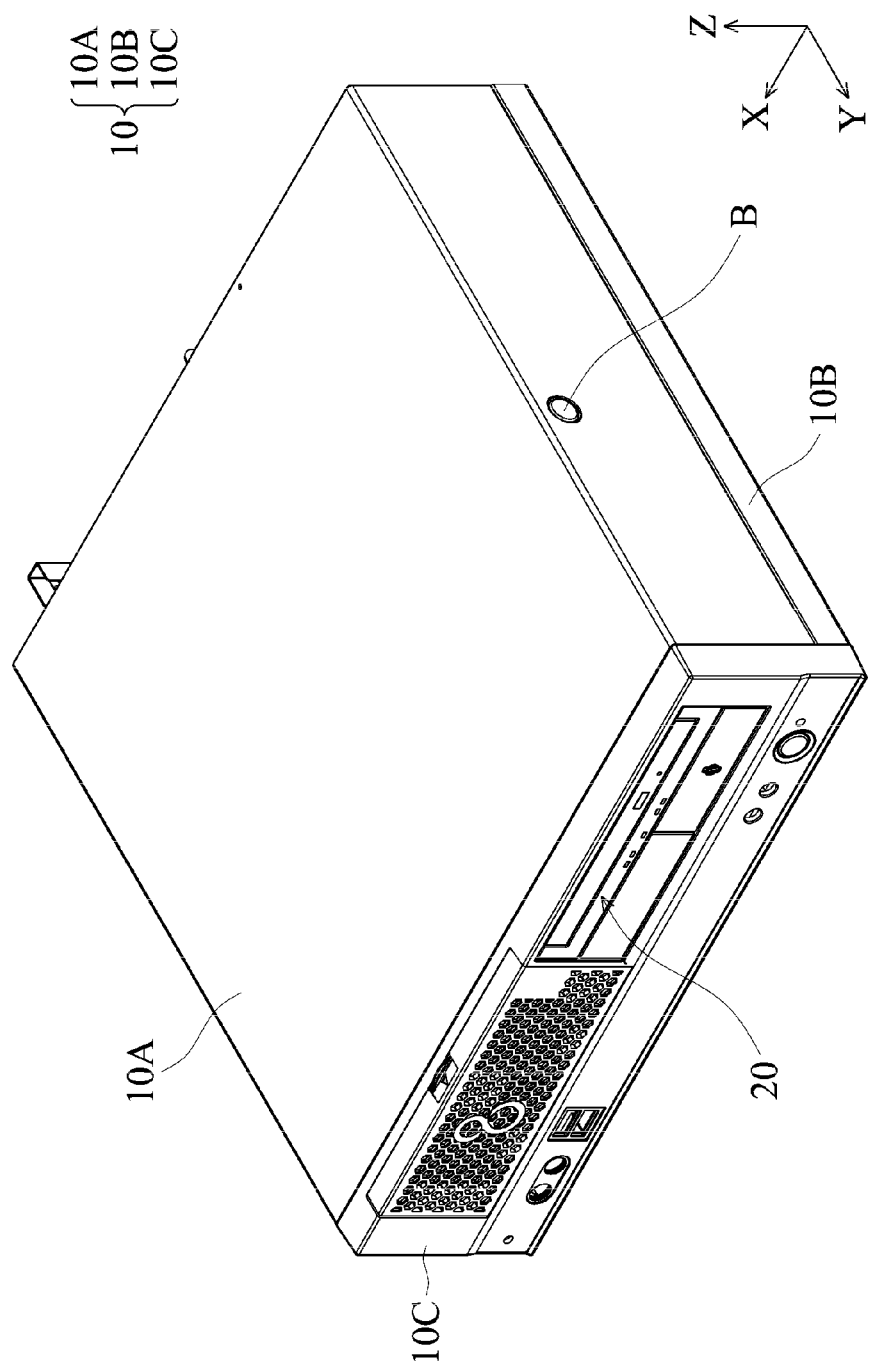
FIG. 1B is a schematic view of the electronic device in FIG. 1A after assembly.

Referring to FIG. 1A and FIG. 1B, an electronic device according to an embodiment of the invention, such as a personal computer (PC) includes a housing 10 and a quick release mechanism 20. A motherboard (not shown) is disposed in the housing 10 and electrically connected to an access unit 24 (FIG. 2A) of the quick release mechanism 20. The housing 10 is configured to receive the quick release mechanism 20, including a top cover 10A, a bottom cover 10B, and a front cover 10C. A button B is disposed on a side of the top cover 10A adjacent to the quick release mechanism 20. In this embodiment, the quick release mechanism 20 is mounted on a bracket C and installed in the housing 10 through the front cover 10C. The bracket C is configured to support the quick release mechanism 20 in the housing 10.

Figure 2A:
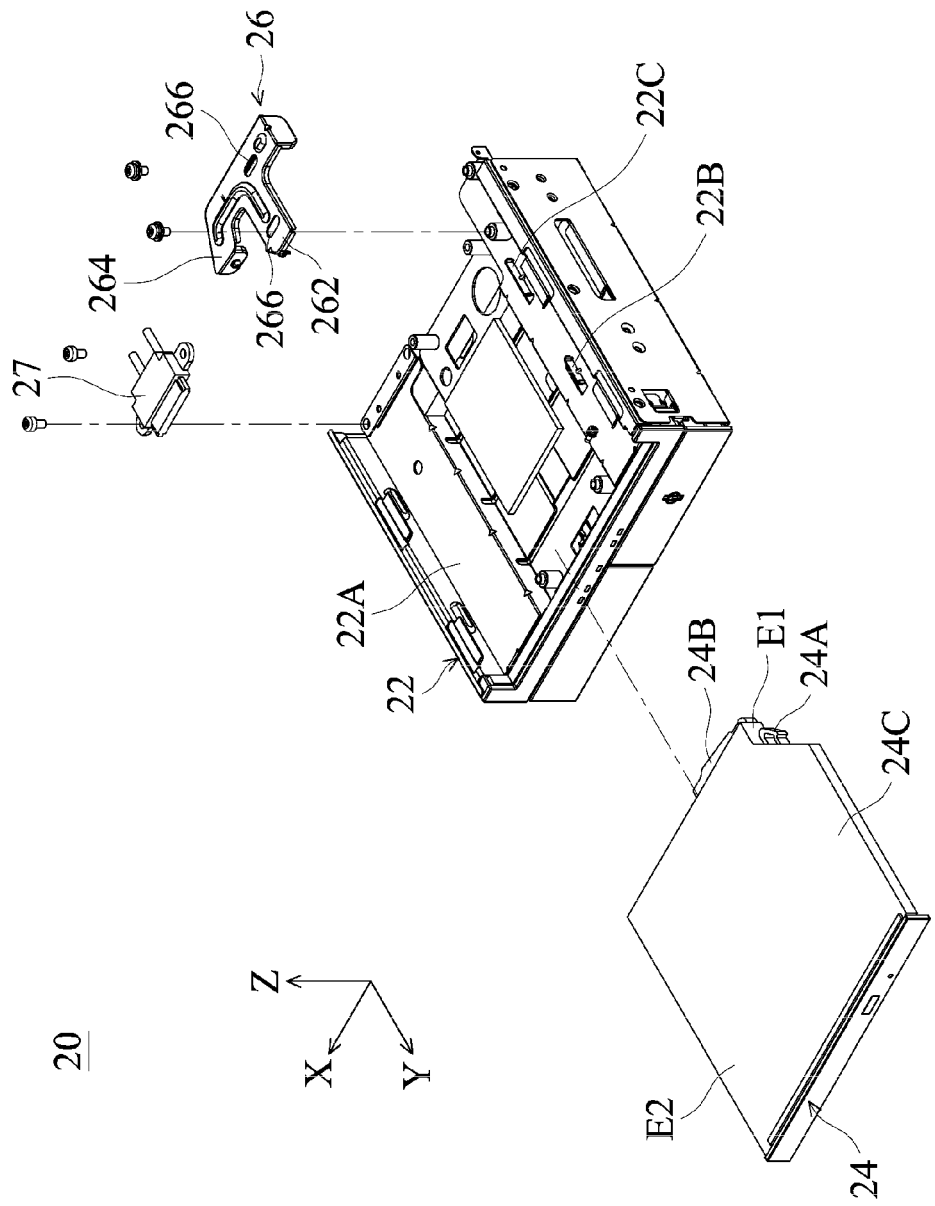
FIG. 2A is an exploded view of the quick release mechanism in FIG. 1A.
Figure 2B:
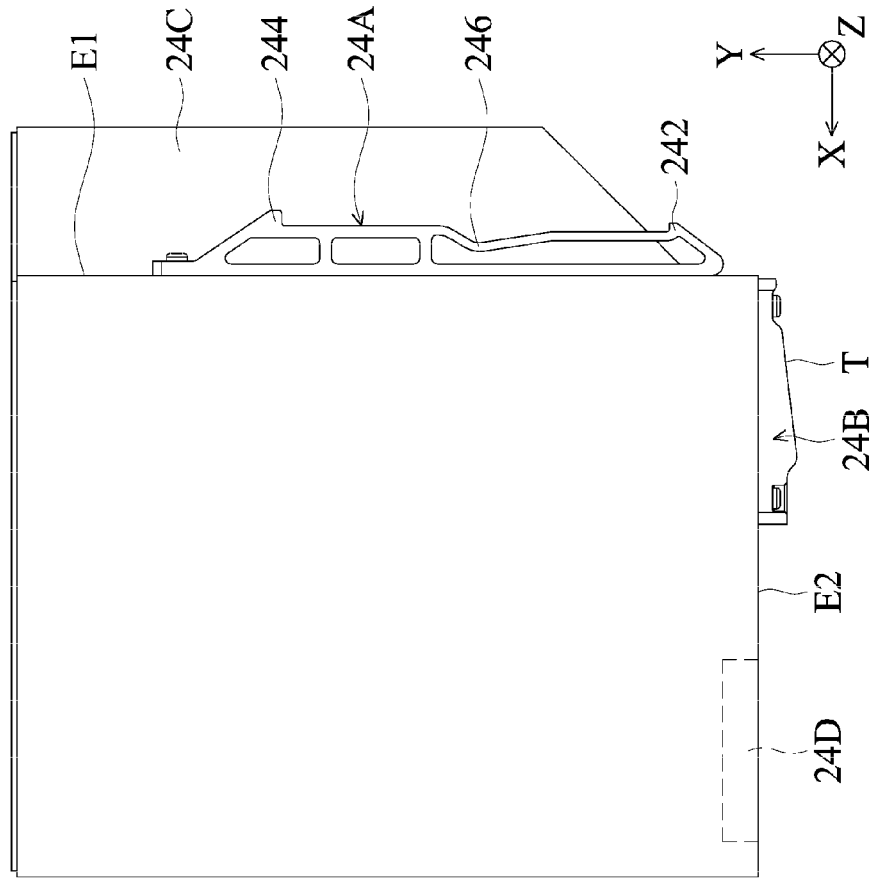
FIG. 2B is a schematic view of the access unit in FIG. 2A from another viewing angle.

Referring to FIG. 2A and FIG. 2B, the quick release mechanism 20 includes a carrier 22. The carrier 22 forms a recess 22A, and several restricting portions 22B and 22C are formed in the recess 22A and extended along the Z direction.

The access unit 24 of the quick release mechanism 20, such as an optical disk drive (ODD) module or a hard disk drive (HDD) module, can be pushed into the recess 22A of the carrier 22 along the −Y direction, or drawn out of the recess 22A along the Y direction.

In this embodiment, the access unit 24 includes an elastic member 24A and a fixed member 24B. As shown in FIG. 2A and FIG. 2B, the elastic member 24A is mounted on a first side E1 of the access unit 24 and underneath a protrusion 24C thereof. Specifically, the elastic member 24A comprises a longitudinal hollow structure extended along the Y direction. A first hook 242 and a second hook 244 are respectively formed on opposite ends of the longitudinal hollow structure. A curved bent portion 246 is formed between the first and second hooks 242 and 244 and depressed toward the interior of the longitudinal hollow structure. In this embodiment, the elastic member 24A may comprise plastic, and the first hook 242 is deformable along the X direction.

Still referring to FIG. 2A and FIG. 2B, the fixed member 24B is mounted on a second side E2 of the access unit 24, wherein the second side E2 is adjacent to and perpendicular to the first side E1. Specifically, the fixed member 24B forms an inclined surface T. In this embodiment, the fixed member 24B may comprise wear-resistant material. Moreover, the access unit 24 further includes a connection port 24D disposed on the second side E2 (FIG. 2B).

The quick release mechanism 20 further includes a movable member 26 and a connector 27. As shown in FIG. 2A, the movable member 26 is connected to the carrier 22 by fasteners, such as screws, through a plurality of elliptic slots 226 on the movable member 26. Thus, the movable member 26 can slide relative to the carrier 22 along the X direction. Moreover, the movable member 26 comprises a y-shaped structure, including a first contact portion 262 and a second contact portion 264 respectively formed at two ends of the y-shaped structure. The connector 27 is mounted on the carrier 22 by fasteners, such as screws, and electrically connected to the connection port 24D (FIG. 2B) of the access unit 24 for providing electrical power to the access unit 24.

The installation and uninstallation procedures of the access unit 24 of the quick release mechanism 20 are further described as follows.

Figure 3A:
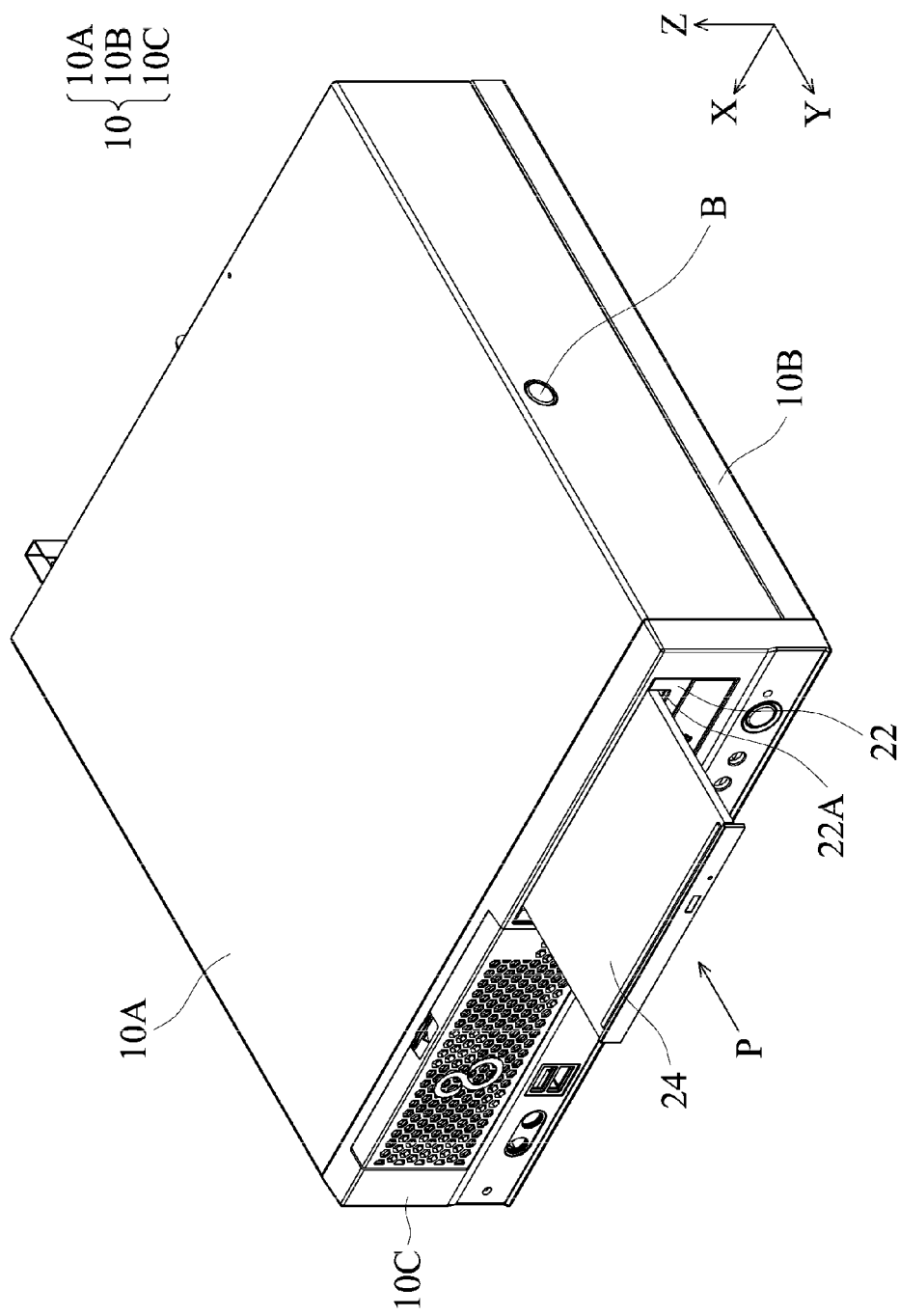
FIGS. 3A-3D are schematic views showing the access unit of the quick release mechanism in FIG. 2A during assembly.
Figure 3B:
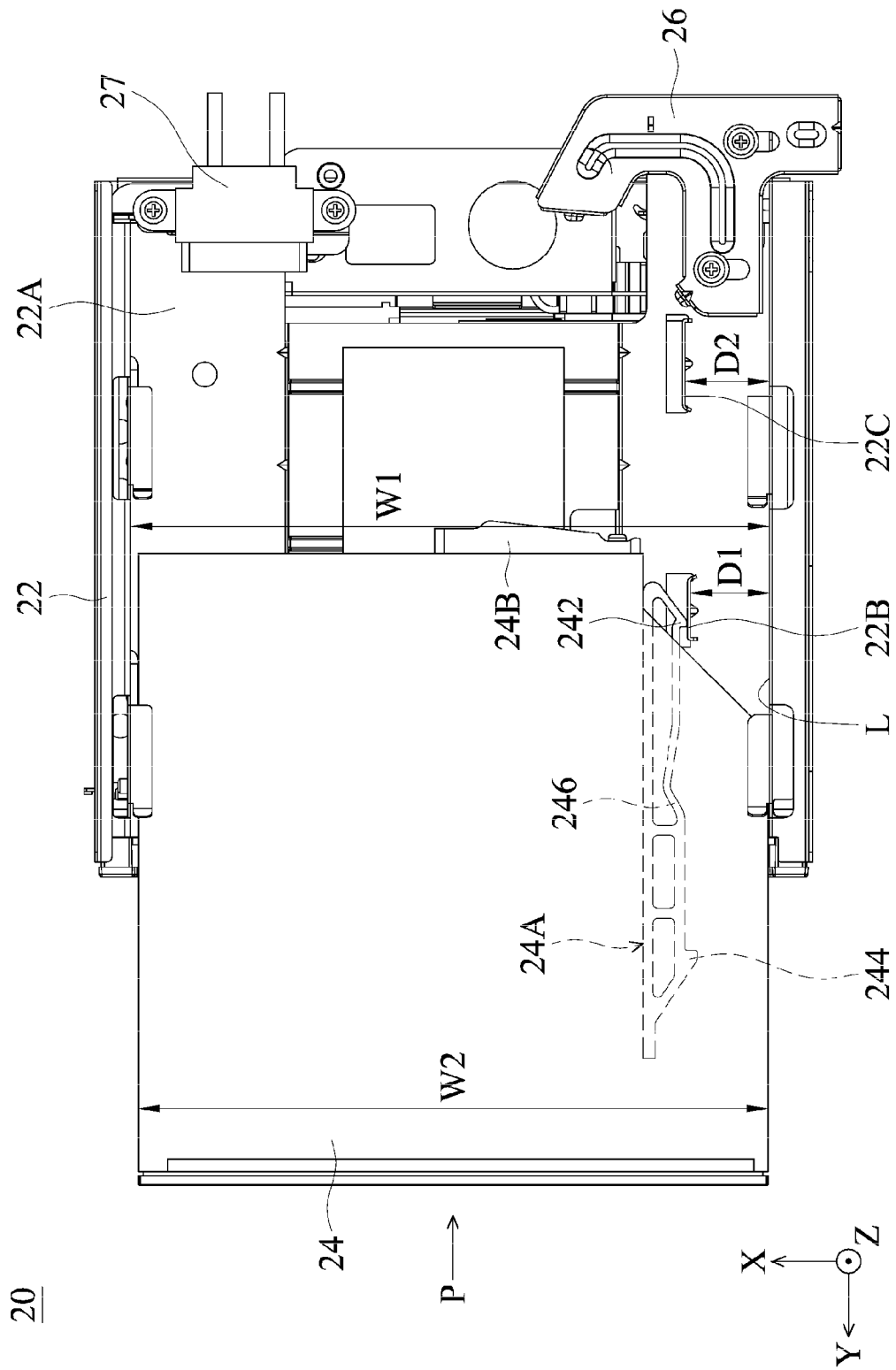

Referring to FIGS. 3A-3D in sequence, wherein FIGS. 3A-3D are schematic views showing the access unit 24 of the quick release mechanism 24 in FIG. 2A during assembly. As shown in FIG. 3A and FIG. 3B, when a force P is exerted on the access unit 24 to move into the carrier 22 in the housing 10 through the front cover 10c of the electronic device, the access unit 24 moves along the recess 22A of the carrier 22 toward the −Y direction. Meanwhile, the first hook 242 of the elastic member 24A that is connected to access unit 24 moves through the restricting portion 22B (second restricting portion) within the recess 22A. In this embodiment, the width W1 of the recess 22A is substantially equal to the width W2 of the access unit 24.

Figure 3C:
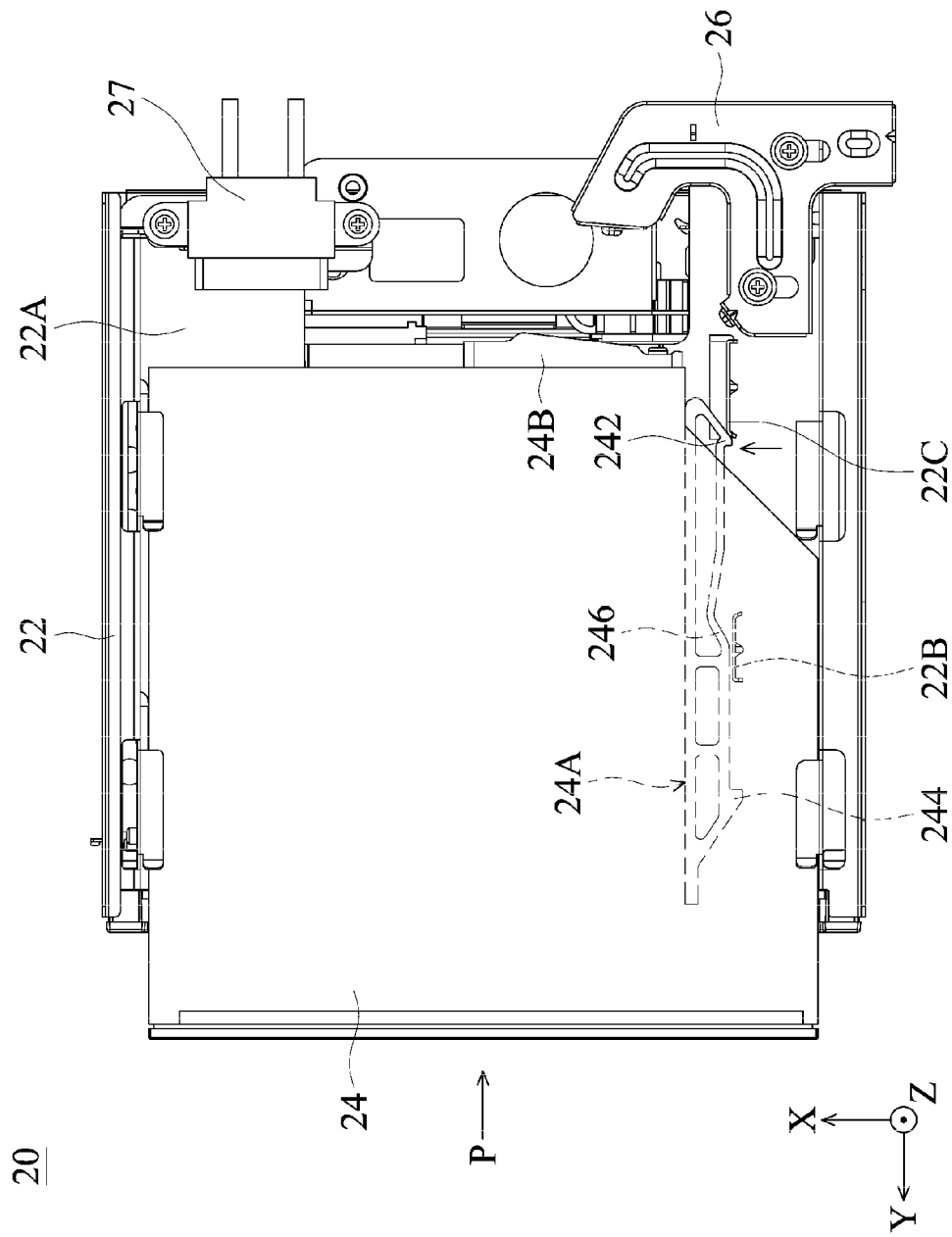

Referring to FIG. 3B, the distance D1 between the restricting portion 22B (second restricting portion) and a sidewall L of the recess 22A is less than the distance D2 between the other restricting portion 22C (first restricting portion) in the recess 22A and the sidewall L (i.e. D1<D2). Accordingly, when the access unit 24 further moves toward the −Y direction along the recess 22A of the carrier 22, the first hook 242 of the elastic member 24A contacts the restricting portion 22C (FIG. 3C). In this state, under actions of the force P along the −Y direction and the reaction force from the restricting portion 22C (as the arrow shows in FIG. 3C), the first hook 242 deforms along the X direction and moves through the restricting portion 22C (first restricting portion) along the −Y direction.

Figure 3D:
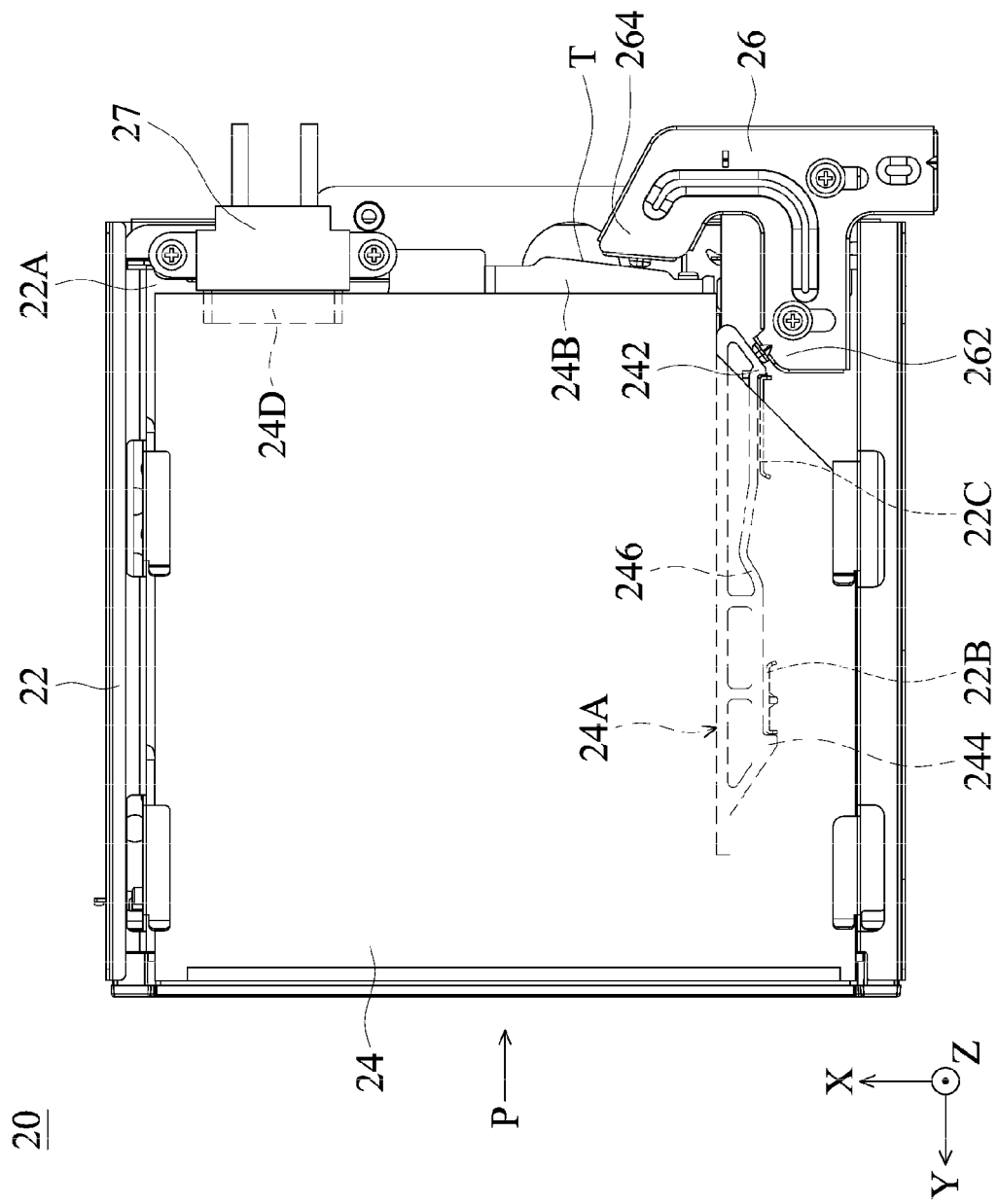

As shown in FIG. 3D, when the first hook 242 completely moves through the restricting portion 22C, the first hook 242 returns along the −X direction by the elasticity thereof, such that the restricting portion 22C (first restricting portion) is engaged with the first hook 242, and the access unit 24 is restricted in the recess 22A. Additionally, when the restricting portion 22C is engaged with the first hook 242, the restricting portion 22B (second restricting portion) is engaged with the second hook 244, so as to stably restrict the access unit 24 within the recess 22A. Meanwhile, the connection port 24D of the access unit 24 is directly electrically connected to the connector 27 on the carrier 22, such that the installation of the access unit 24 of the quick release mechanism 20 is completed.

Figure 4:
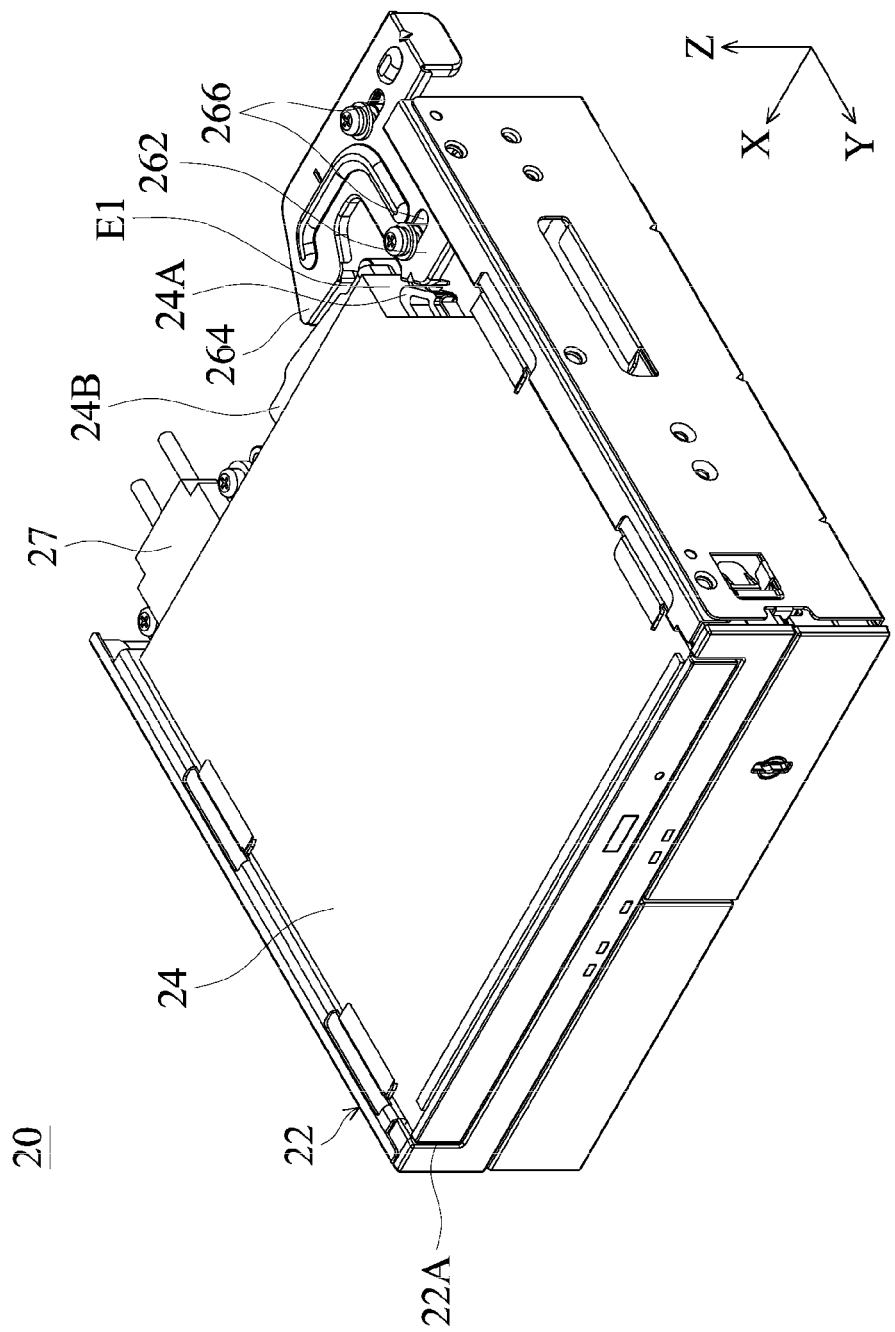
FIG. 4 is a schematic view of the quick release mechanism in FIG. 2A after assembly.

Referring to FIG. 3D, when the access unit 24 is completely installed into the recess 22A, the first hook 242 of the elastic member 24A is positioned corresponding to the first contact portion 262 of the movable member 26, and the fixed member 24B is positioned corresponding to the second contact portion 264 of the movable member 26. FIG. 4 is a schematic view of the quick release mechanism 20 in FIG. 2A after assembly.

Figure 5A:
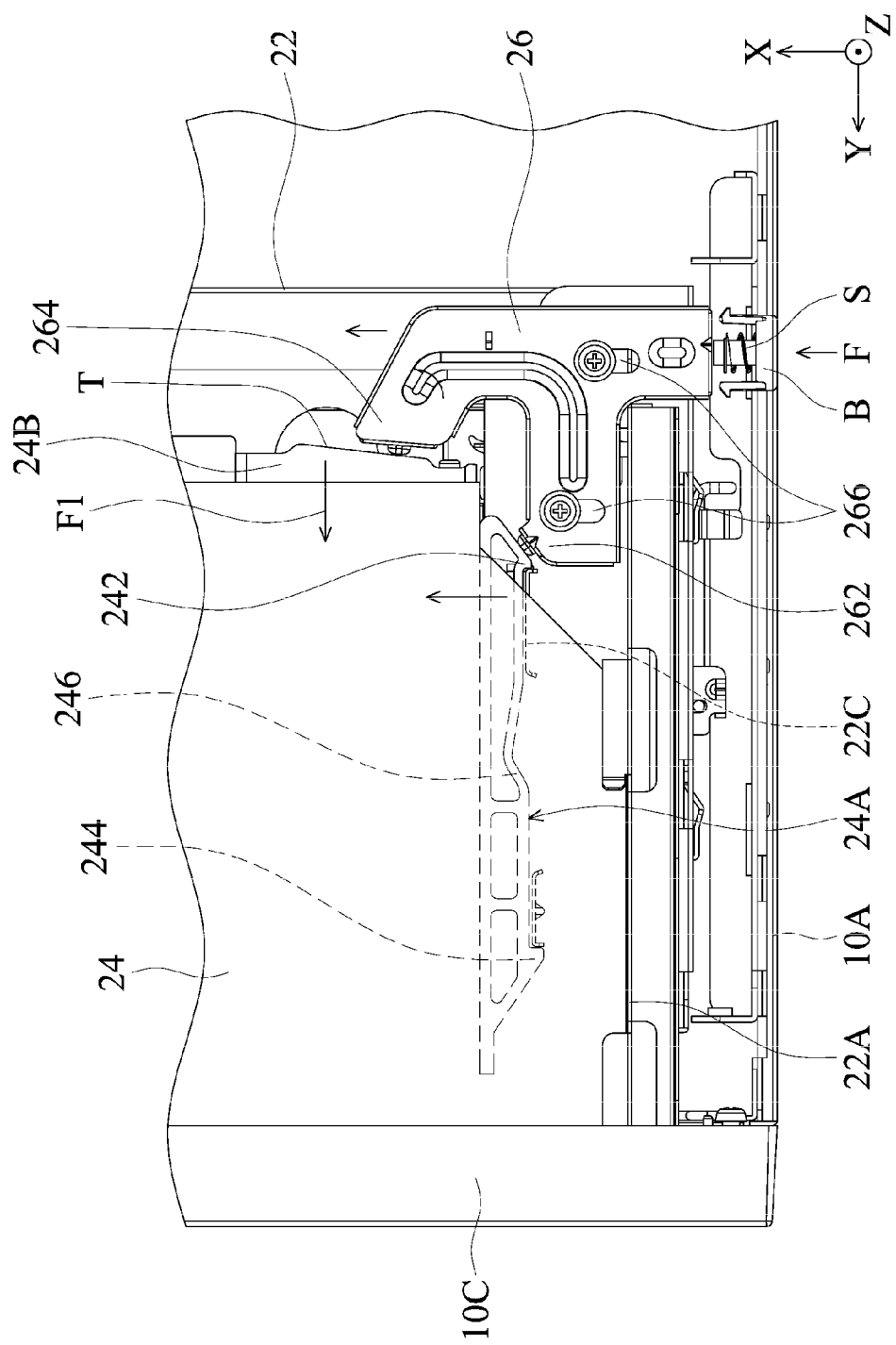
FIG. 5A is a schematic view showing an external force F exerted on a button B disposed on the top cover of the electronic device.

FIG. 5A is a schematic view showing an external force F exerted on a button B disposed on the top cover 10A of the electronic device, wherein the button B corresponds to the movable member 26. With this mechanism, when the external force F is exerted on the button B to move along the X direction (first direction), the button B pushes the movable member 26 to move along the X direction. In the meantime, the first contact portion 262 of the movable member 26 pushes the first hook 242 of the elastic member 24A, such that the first hook 242 deforms along the X direction and separates from the restricting portion 22C (first restricting portion) in the recess 22A.

It should be noted that the bent portion 246 in this embodiment is formed adjacent to the first hook 24 of the elastic member 24A. Thus, the first hook 242 can deform and separate from the restricting portion 22C in a direction substantially parallel to the X axis (FIG. 5A). Consequently, the abrasion between the first hook 242 and the restricting portion 22C is reduced, and the usage life of the elastic member 24A is extended.

Figure 5B:
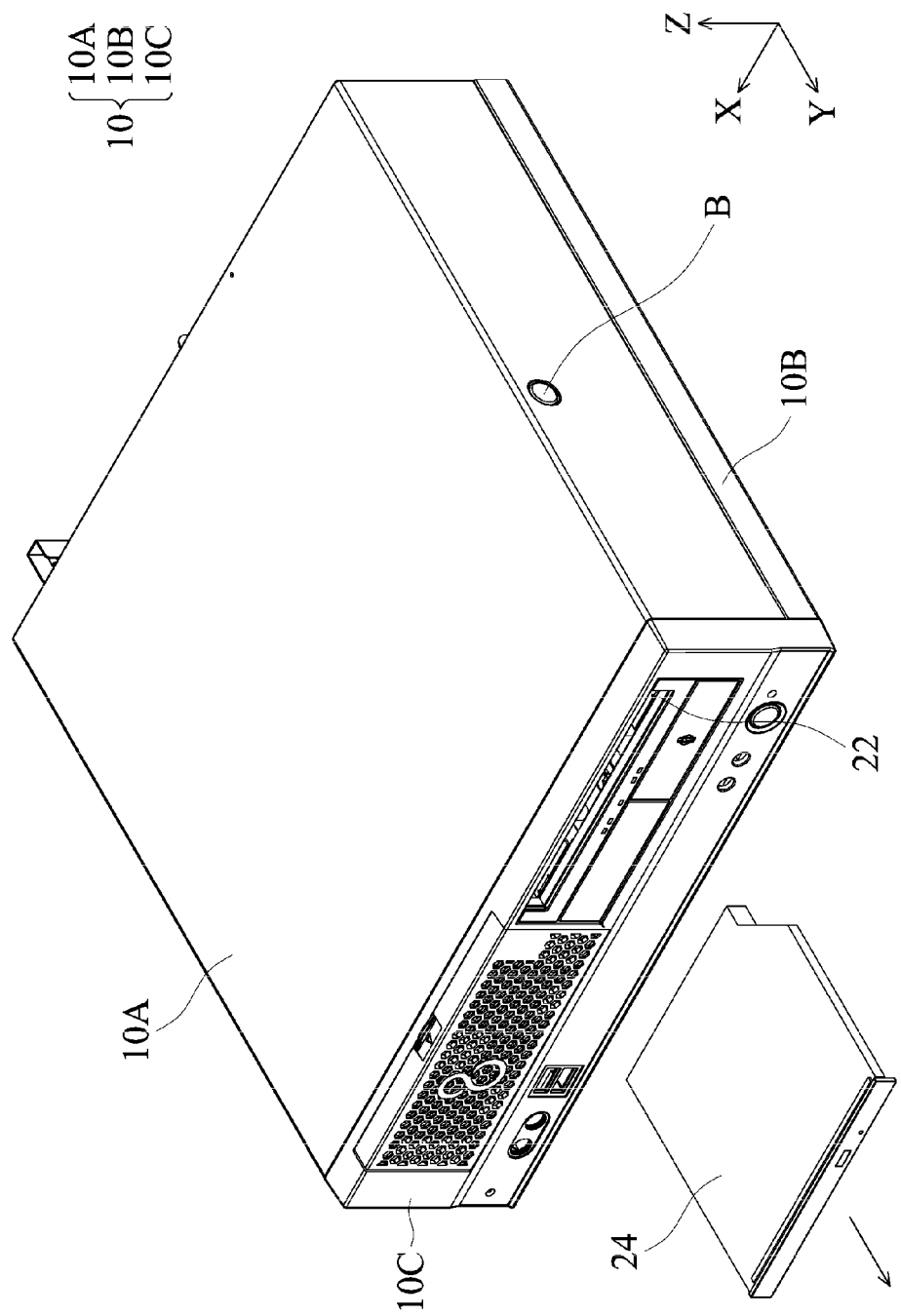
FIG. 5B is a schematic view showing the access unit drawn out of the front cover of the electronic device.

After the first contact portion 262 of the movable member 26 pushes the first hook 242 to deform and separate from the restricting portion 22C, the second contact portion 264 of the movable member 26 contacts the inclined surface T of the fixed member 24B. With the further movement of the movable member 26 along the X direction, the second contact portion 264 pushes the fixed member 24B and exerts a component force F1 on the inclined surface T of the fixed member 24B. Therefore, the access unit 24 and the fixed member 24B move along the Y direction (second direction) in FIG. 5A, and the access unit 24 separates from the connector 27 on the carrier 22 (FIG. 3D). Accordingly, users can slide the access unit 24 along the access 22A of the carrier 22 and draw out the access unit 24 from the housing 10 through the front cover 10C (FIG. 5B), such that the uninstallation of the access unit 24 of the quick release mechanism 20 is completed.

In this embodiment, the button B further includes a spring S (FIG. 5A), such as a compression spring. Moreover, an expansion spring (not shown) can also be disposed between the movable member 26 and the carrier 22. Consequently, when the external force F exerted on the button B is released, the button B and the movable member 26 can return along the −X direction by the elastic force of the aforementioned springs.

As described above, the invention provides an electronic device, such as a personal computer. The electronic device is capable of quick installation and uninstallation of the access unit, for example an ODD module or an HDD module, without complicated procedures, such as detaching the housing, removing the connector, and loosening the screws etc. Therefore, convenient maintenance for users is achieved, and the production efficiency and the manufacture overhead (MOH) for the production lines are improved.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
   a housing;
   a carrier, disposed in the housing and including a recess and a first restricting portion in the recess;
   an access unit, disposed in the recess;
   an elastic member, connected to the access unit, wherein the first restricting portion is engaged with the elastic member to restrict the access unit in the recess;
   a fixed member, connected to the access unit; and
   a movable member, movably disposed on the carrier and including a first contact portion and a second contact portion, wherein when an external force is exerted on the movable member along a first direction, the first contact portion pushes the elastic member along the first direction to deform and separate from the first restricting portion, and the second contact portion pushes the fixed member to move along a second direction perpendicular to the first direction, such that the access unit can be removed from the housing.

2. The electronic device as claimed in claim 1, wherein the fixed member includes an inclined surface, and when the fixed member is pushed by the second contact portion, the second contact portion forces the inclined surface to move the fixed member and the access unit along the second direction.

3. The electronic device as claimed in claim 1, wherein the elastic member comprises a longitudinal hollow structure substantially extended along the second direction.

4. The electronic device as claimed in claim 3, wherein the elastic member includes a first hook, and the access unit is restricted in the recess when the first hook is engaged with the first restricting portion.

5. The electronic device as claimed in claim 4, wherein when the elastic member is pushed by the first contact portion, the first contact portion pushes the first hook to deform along the first direction and separate from the first restricting portion.

6. The electronic device as claimed in claim 4, wherein the elastic member further includes a second hook, and the first and second hooks are respectively formed on opposite ends of the longitudinal hollow structure, and the carrier further includes a second restricting portion in the recess, wherein when the first restricting portion is engaged with the first hook, and the second restricting portion is engaged with the second hook, the access unit is restricted in the recess.

7. The electronic device as claimed in claim 6, wherein the elastic member further includes a bent portion formed between the first hook and the second hook, and the bent portion is depressed toward the interior of the longitudinal hollow structure.

8. The electronic device as claimed in claim 1, wherein the movable member comprises a y-shaped structure.

9. The electronic device as claimed in claim 1, further comprising a button disposed on the housing, wherein when the external force is exerted on the button along the first direction, the button pushes the movable member to move along the first direction.

10. The electronic device as claimed in claim 1, further comprising a connector disposed on the carrier, wherein when the first restricting portion is engaged with the elastic member to restrict the access unit in the recess, the access unit is connected to the connector.

* * * * *